(12) United States Patent
Lee et al.

(10) Patent No.: US 8,169,391 B2
(45) Date of Patent: May 1, 2012

(54) DISPLAY APPARATUS

(75) Inventors: Jun-Pyo Lee, Cheonan-si (KR);
Jung-Won Kim, Seoul (KR);
Byoung-Jun Lee, Cheonan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 722 days.

(21) Appl. No.: 12/325,475

(22) Filed: Dec. 1, 2008

(65) Prior Publication Data
US 2010/0001940 A1    Jan. 7, 2010

(30) Foreign Application Priority Data

Jul. 4, 2008  (KR) .................. 10-2008-0065117

(51) Int. Cl.
*G09G 3/36* (2006.01)
(52) U.S. Cl. .......................... 345/90; 345/214
(58) Field of Classification Search .................. None
See application file for complete search history.

(56) References Cited

U.S. PATENT DOCUMENTS

| | | | | |
|---|---|---|---|---|
| 5,923,310 A * | 7/1999 | Kim | | 345/90 |
| 6,407,732 B1 * | 6/2002 | Stiens et al. | | 345/204 |
| 6,677,925 B1 * | 1/2004 | Kawaguchi et al. | | 345/98 |
| 6,724,359 B2 * | 4/2004 | Yamamoto et al. | | 345/92 |
| 7,034,789 B2 * | 4/2006 | Takeuchi et al. | | 345/90 |
| 2002/0047822 A1 * | 4/2002 | Senda et al. | | 345/90 |
| 2004/0164943 A1 * | 8/2004 | Ogawa et al. | | 345/92 |
| 2004/0222953 A1 * | 11/2004 | Smith | | 345/87 |
| 2005/0088386 A1 | 4/2005 | Kao et al. | | |
| 2006/0097972 A1 * | 5/2006 | Takeuchi et al. | | 345/90 |
| 2006/0192739 A1 * | 8/2006 | Shin et al. | | 345/90 |
| 2007/0018927 A1 * | 1/2007 | Kim | | 345/92 |
| 2007/0075937 A1 * | 4/2007 | Kim | | 345/76 |
| 2007/0164957 A1 * | 7/2007 | Hsieh et al. | | 345/90 |
| 2007/0273630 A1 * | 11/2007 | Lee | | 345/92 |
| 2008/0036704 A1 * | 2/2008 | Kim et al. | | 345/76 |
| 2008/0062107 A1 * | 3/2008 | Su et al. | | 345/92 |
| 2008/0136765 A1 * | 6/2008 | Neugebauer | | 345/98 |
| 2008/0303768 A1 * | 12/2008 | Do et al. | | 345/90 |
| 2009/0135165 A1 * | 5/2009 | Fukuzako et al. | | 345/204 |
| 2009/0237339 A1 * | 9/2009 | Pai et al. | | 345/90 |
| 2010/0001940 A1 * | 1/2010 | Lee et al. | | 345/90 |

FOREIGN PATENT DOCUMENTS

| | | |
|---|---|---|
| KR | 10-2002-0095200 | 12/2002 |
| KR | 10-2003-0012668 | 2/2003 |
| KR | 10-2003-0028971 | 4/2003 |

* cited by examiner

*Primary Examiner* — Peter Vincent Agustin
(74) *Attorney, Agent, or Firm* — H.C. Park & Associates, PLC

(57) ABSTRACT

A display apparatus includes a plurality of pixels. Each pixel includes a main pixel, a sub-pixel, and a boosting capacitor. The main pixel receives a data signal in response to a first gate signal and is charged with a main pixel voltage. The sub-pixel receives the data signal in response to a second gate signal, and is charged with a sub-pixel voltage. The boosting capacitor is provided between the main pixel and the sub-pixel to increase the main pixel voltage when the sub-pixel is charged with the sub-pixel voltage in response to the second gate signal.

19 Claims, 7 Drawing Sheets

DISPLAY APPARATUS

CROSS-REFERENCE TO RELATED APPLICATION

This application claims priority from and the benefit of Korean Patent Application No. 2008-65117, filed on Jul. 4, 2008, which is hereby incorporated by reference for all purposes as if fully set forth herein.

BACKGROUND OF THE INVENTION

1. Field of the Invention

The present invention relates to a display apparatus. More particularly, the present invention relates to a display apparatus capable of improving lateral visibility of the display apparatus.

2. Discussion of the Background

A liquid crystal display (LCD) represents a limited viewing angle as compared with other display apparatuses. In order to improve the viewing angle, various driving schemes such as a Patterned Vertical Alignment (PVA) mode, a Multi-domain Vertical Alignment (MVA) mode and a Super Patterned Vertical Alignment (SPVA) mode have been suggested to drive the LCD.

An SPVA-mode LCD includes pixels that each have two sub-pixels, and each sub-pixel includes a main pixel electrode and a sub-pixel electrode. Different sub-voltages are applied to the main pixel electrode and the sub-pixel electrode to form domains having different gray scales in the pixel. Since human eyes looking at the LCD tend to perceive an intermediate value of the two sub-voltages, degradation of the lateral viewing angle caused by distortion of a gamma curve at a level below an intermediate gray scale is prevented, so that the lateral visibility of the LCD is improved.

The SPVA-mode LCD is classified into a Coupling-Capacitor (CC) type LCD and a Two-Transistors (TT) type LCD according to a driving scheme thereof. The CC type LCD adopts a driving scheme in which a coupling capacitor is added between the main pixel electrode and the sub-pixel electrode to drop a data voltage applied to the sub-pixel electrode such that a voltage applied to the sub-pixel electrode is lower than a voltage applied to the main pixel electrode. The TT type LCD adopts a driving scheme in which two transistors are used to apply a main pixel voltage and a sub-pixel voltage having different voltage levels to the main pixel electrode and the sub-pixel electrode, respectively.

Since the CC type LCD includes fewer transistors as compared with the TT type LCD, the CC type LCD has advantages in terms of power consumption. However, since the sub-voltage applied to the sub-pixel electrode is lower than input data voltage, brightness of the LCD is lowered at a white gray scale.

SUMMARY OF THE INVENTION

The present invention provides a display apparatus having an improved lateral visibility.

Additional features of the invention will be set forth in the description which follows, and in part will be apparent from the description, or may be learned by practice of the invention.

The present invention discloses a display apparatus that has a plurality of pixels to display images and includes a main pixel, a sub-pixel, and a boosting capacitor. The main pixel receives a data signal in response to a first gate signal, and is charged with a main pixel voltage. The sub-pixel receives the data signal in response to a second gate signal, and the sub-pixel is charged with a sub-pixel voltage. The boosting capacitor increases the main pixel voltage when the sub-pixel is charged with the sub-pixel voltage in response to the second gate signal.

The present invention also discloses a display apparatus that includes a plurality of pixels, each pixel including a main pixel and a sub-pixel. The main pixel receives a data voltage in response to a first gate signal from a first gate line, and is charged with the data voltage. The sub-pixel receives the data voltage in response to a second gate signal from a second gate line, and is charged with the data voltage. The second gate signal follows the first gate signal, and the main pixel is charged with a first voltage that exceeds the data voltage in response to the sub-pixel being charged with the data voltage, the first gate signal being off when the main pixel is charged with the first voltage.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
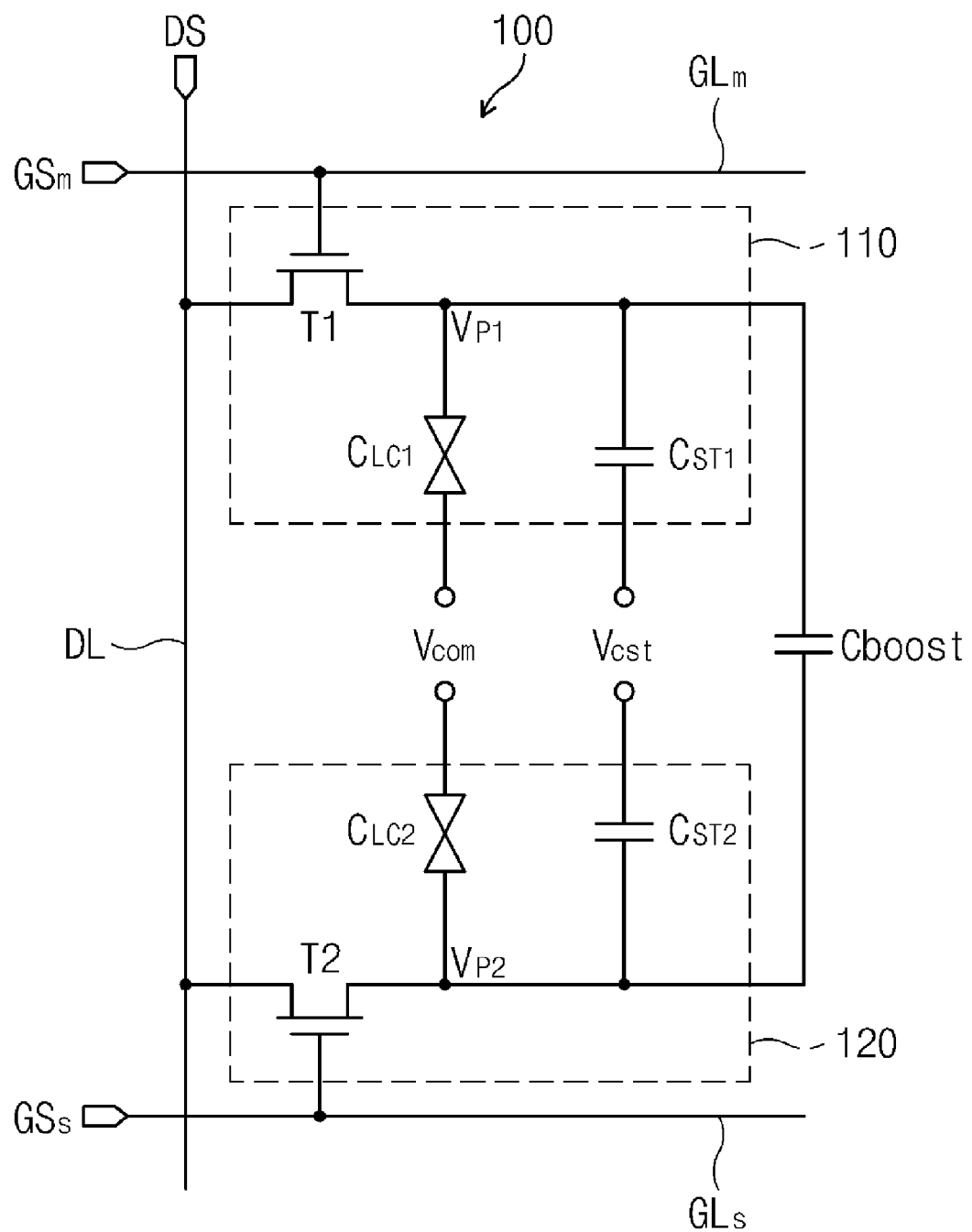
FIG. 1 is an equivalent circuit diagram showing a pixel according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

FIG. 1 is an equivalent circuit diagram showing a pixel according to an exemplary embodiment of the present invention.

As shown in FIG. 1, a plurality of pixels is arranged in a matrix on a liquid crystal display. In the present embodiment, since the pixels have the same structure and function, the following description will be focused on one pixel 100 as an example.

The liquid crystal display includes a plurality of main gate lines, a plurality of sub-gate lines formed in parallel to the main gate lines and a plurality of data lines that are insulated from the main and sub-gate lines while crossing the main and the sub-gate lines. The pixels are provided in pixel areas defined by the main gate lines, the sub-gate lines and the data lines, respectively. As shown in FIG. 1, the pixel 100 is connected to a corresponding main gate line GLm of the main gate lines, a corresponding sub-gate line GLs of the sub-gate lines, and a corresponding data line DL of the data lines.

The pixel 100 includes a main pixel 110 connected to the main gate line GLm and the data line DL, a sub-pixel 120 connected to the sub-gate line GLs and the data line DL, and a boosting capacitor $C_{boost}$. A first gate signal GSm is applied to the main gate line GLm, a second gate signal GSs is applied to the sub-gate line GLs, and a data signal DS is applied to the data line DL.

The main pixel 110 includes a first thin film transistor T1, a first liquid crystal capacitor $C_{LC1}$, and a first storage capacitor $C_{ST1}$. The first thin film transistor T1 includes a gate electrode connected to the main gate line GLm, a source electrode connected to the data line DL, and a drain electrode connected to the first liquid crystal capacitor $C_{LC1}$. The first liquid crystal capacitor $C_{LC1}$ includes a first electrode (hereinafter, referred to as a first pixel electrode) connected to the drain electrode and receiving a main pixel voltage $V_{p1}$, and a second electrode (hereinafter, referred to a common electrode) receiving a common voltage Vcom. The first storage capacitor $C_{ST1}$ includes a first electrode connected to the first pixel electrode and a second electrode receiving a storage voltage $V_{cst}$.

The sub-pixel 120 includes a second thin film transistor T2, a second liquid crystal capacitor $C_{LC2}$, and a second storage capacitor $C_{ST2}$. The second thin film transistor T2 includes a gate electrode connected to the sub-gate line GLs, a source electrode connected to the data line DL, and a drain electrode connected to the second liquid crystal capacitor $C_{LC2}$. The second liquid crystal capacitor $C_{LC2}$ includes a first electrode (hereinafter, referred to as a second pixel electrode) connected to the drain electrode and receiving a sub-pixel voltage $V_{p2}$, and the common electrode receiving the common voltage $V_{com}$. The second storage capacitor $C_{ST2}$ includes a first electrode connected to the second pixel electrode and a second electrode receiving the storage voltage $V_{cst}$.

The boosting capacitor $C_{boost}$ includes a first electrode connected to the drain electrode of the first thin film transistor T1 and a second electrode connected to the drain electrode of the second thin film transistor T2. The first electrode of the boosting capacitor $C_{boost}$ may be directly connected to the drain electrode of the first thin film transistor T1 or one of the first pixel electrode and the first electrode of the first storage capacitor $C_{ST1}$. The second electrode of the boosting capacitor $C_{boost}$ may be directly connected to the drain electrode of the second thin film transistor T2 or one of the second pixel electrode and the first electrode of the second storage capacitor $C_{ST2}$.

A connection structure among the boosting capacitor $C_{boost}$, the main pixel 110, and the sub-pixel 120 will be described in detail below with reference to FIG. 4 and FIG. 5.

Figure 2:
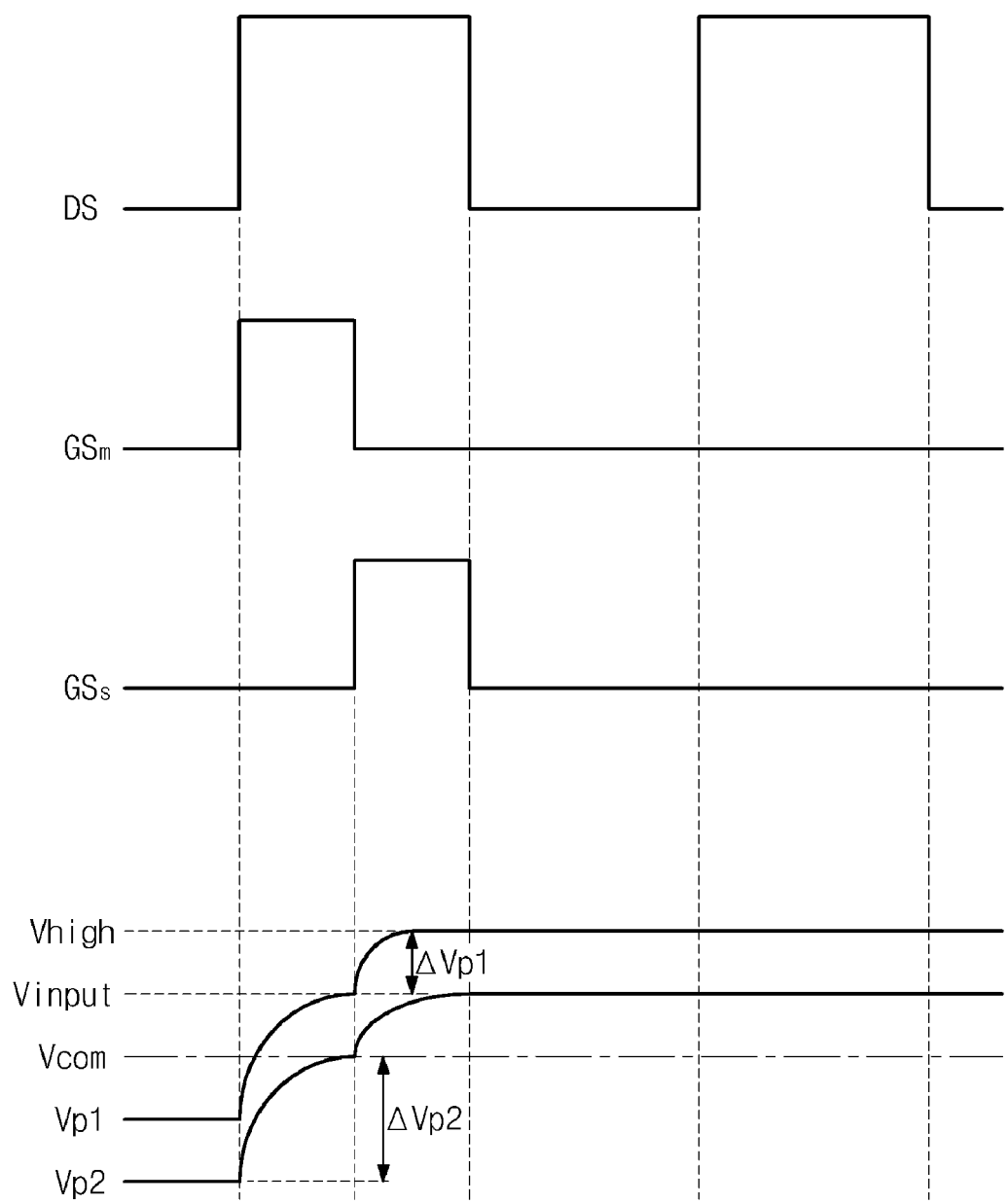
FIG. 2 is a waveform diagram of signals shown in FIG. 1.

FIG. 2 is a waveform diagram of signals shown in FIG. 1.

In a state in which the number of the main gate lines formed in the display apparatus is n (n is a natural number greater than or equal to 1), the number of the sub-gate lines formed in the display apparatus is n, one frame has a time period of 1F, and 1F/2n is represented as 1H, as shown in FIG. 2. The first gate signal GSm is maintained in a high state for an earlier period of H/2, and the second gate signal GSs is maintained in a high state for a later period of H/2. The data signal DS has the same value for an entire period 1H, and a polarity of the data signal DS is inverted at a period of 1H. Although not shown in FIG. 2, the polarity of the data signal DS may be inverted every frame.

When the first gate signal GSm is applied to the main gate line GLm, the first thin film transistor T1 is turned on, so that the data signal DS is output from the first thin film transistor T1. The first liquid crystal capacitor $C_{LC1}$ is charged with a main pixel voltage $V_{p1}$ according to the output data signal DS.

As shown in FIG. 2, if the data signal DS of a present frame has a positive polarity relative to the common voltage Vcom, the main pixel voltage $V_{p1}$ is increased to an input voltage $V_{input}$ corresponding to the potential difference between the data signal DS and the common voltage $V_{com}$ for the period of H/2 in which the first gate signal GSm is maintained in a high state.

Since the main pixel 110 is connected to the sub-pixel 120 by the boosting capacitor $C_{boost}$, the second liquid crystal capacitor $C_{LC2}$ is charged with a pre-charge voltage $\Delta V_{p2}$ by the increased main pixel voltage $V_{p1}$ for the period of H/2 in which the first gate signal GSm is maintained in the high state.

The pre-charge voltage $\Delta V_{p2}$ is defined by equation 1 described below.

$$\Delta V_{p2} = \frac{C_{boost}}{C_{LC2} + C_{ST2} + C_{boost}}(V'_{p1} - V_{p1}) \qquad \text{Equation 1}$$

In equation 1, $V'_{p1}$ represents a main pixel voltage of a previous frame, and $V_{p1}$ represents a main pixel voltage of the present frame.

Subsequently, when the second gate signal GSs is applied to the sub-gate line GLs, the second thin film transistor T2 is turned on, so that the data signal DS is output from the second thin film transistor T2. The second liquid crystal capacitor $C_{LC2}$ is charged with a sub-pixel voltage $V_{p2}$ according to the output data signal DS.

As shown in FIG. 2, the sub-pixel voltage $V_{p2}$ is increased to the input voltage $V_{input}$ for the period of H/2 in which the second gate signal GSs is maintained in a high state. In this case, since the second liquid crystal capacitor $C_{LC2}$ is charged with the pre-charge voltage $\Delta V_{p2}$, the time taken to increase the sub-pixel voltage $V_{p2}$ up to the input voltage $V_{input}$ is reduced. As a result, a response time of liquid crystals may be improved.

If the sub-pixel voltage $V_{p2}$ is increased for the period of H/2 in which the second gate signal GSs is maintained in a high state, the main pixel voltage $V_{p1}$ charged in the first liquid crystal capacitor $C_{LC1}$ may be consequently increased.

In the present exemplary embodiment, variation $\Delta V_{p1}$ of the main pixel voltage $V_{p1}$ is defined by equation 2 described below.

$$\Delta V p1 = \frac{Cboost}{C_{LC1} + C_{ST1} + Cboost}(\Delta V p2 - V p2) \quad \text{Equation 2}$$

In equation 2, $\Delta V_{p2}$ indicates the pre-charge voltage defined by equation 1.

If the main pixel voltage $V_{p1}$ is increased by the variation $\Delta V_{p1}$ defined in equation 2, the main pixel voltage $V_{p1}$ may have a high voltage $V_{high}$ greater than the sub-pixel voltage $V_{p2}$. The main pixel voltage $V_{p1}$ may have the high voltage $V_{high}$ greater than the input voltage $V_{input}$, so that the response time of the liquid crystals may be improved. Even after the first and second gate signals GSm and GSs are decreased to a low level, the sub-pixel voltage $V_{p2}$ may be maintained at a voltage level corresponding to the input voltage $V_{input}$ and the main pixel voltage $V_{p1}$ may be maintained at a level of high voltage $V_{high}$ greater than the input voltage $V_{input}$.

Figure 3:
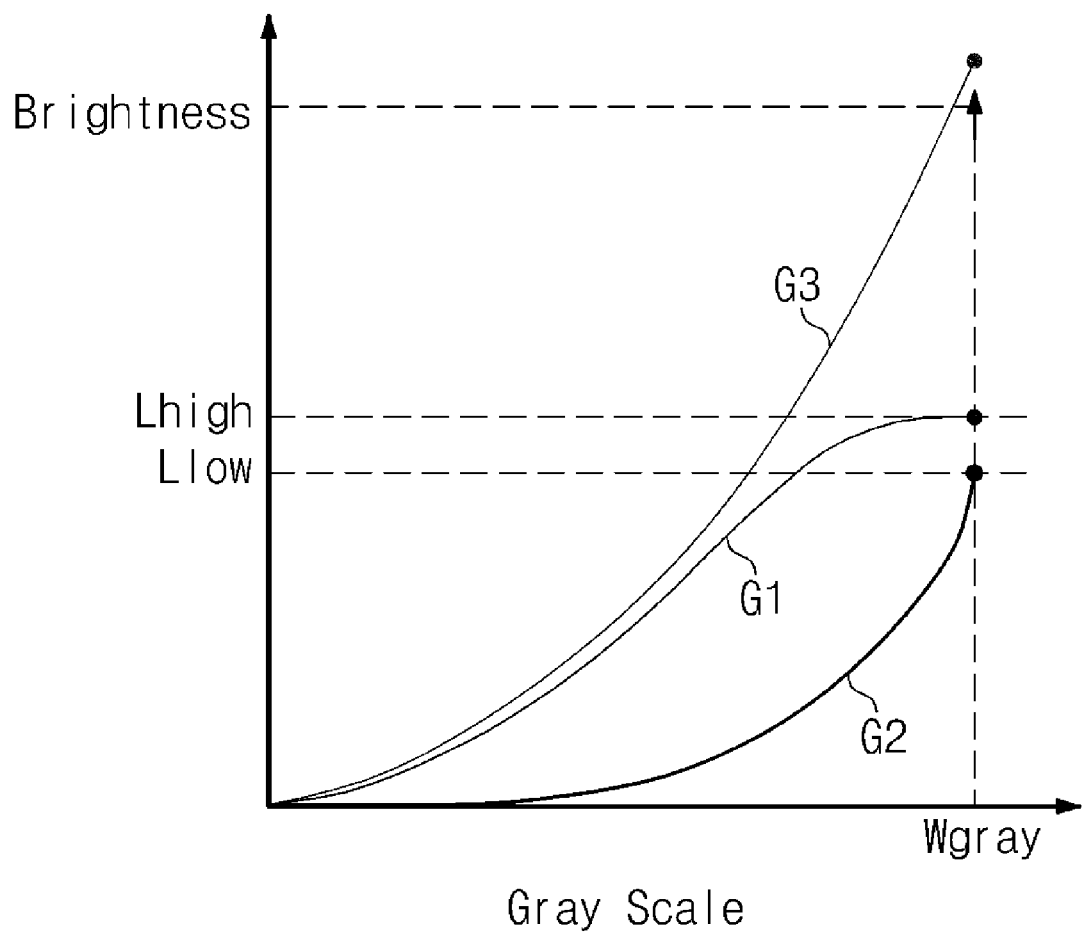
FIG. 3 is a graph showing brightness of a main pixel and a sub-pixel according to a gray scale.

FIG. 3 is a graph showing brightness of a main pixel and a sub-pixel according to a gray scale. In FIG. 3, a first graph G1 represents brightness of the main pixel, a second graph G2 represents brightness of the sub-pixel, and a third graph G3 represents the sum of brightness of the main pixel and the sub-pixel.

As shown in FIG. 3, the sub-pixel 120 has a first brightness $L_{low}$ corresponding to the input voltage $V_{input}$ and the main pixel 110 has a second brightness $L_{high}$ corresponding to a high voltage $V_{high}$ greater than the input voltage $V_{input}$ at a white gray scale $W_{gray}$.

As described above, if different voltages are applied to the main pixel 110 and the sub-pixel 120, respectively, human eyes looking at the liquid crystal display may tend to perceive an intermediate value of the first brightness $L_{low}$ and the second brightness $L_{high}$. Accordingly, degradation of lateral visibility caused by distortion of a gamma curve at a level below an intermediate gray scale may be prevented.

In addition, since the main pixel 110 has the second brightness $L_{high}$ greater than the first brightness $L_{low}$ corresponding to the high voltage $V_{high}$ at the white gray scale $W_{gray}$, overall brightness of the liquid crystal display may be improved.

Figure 4:
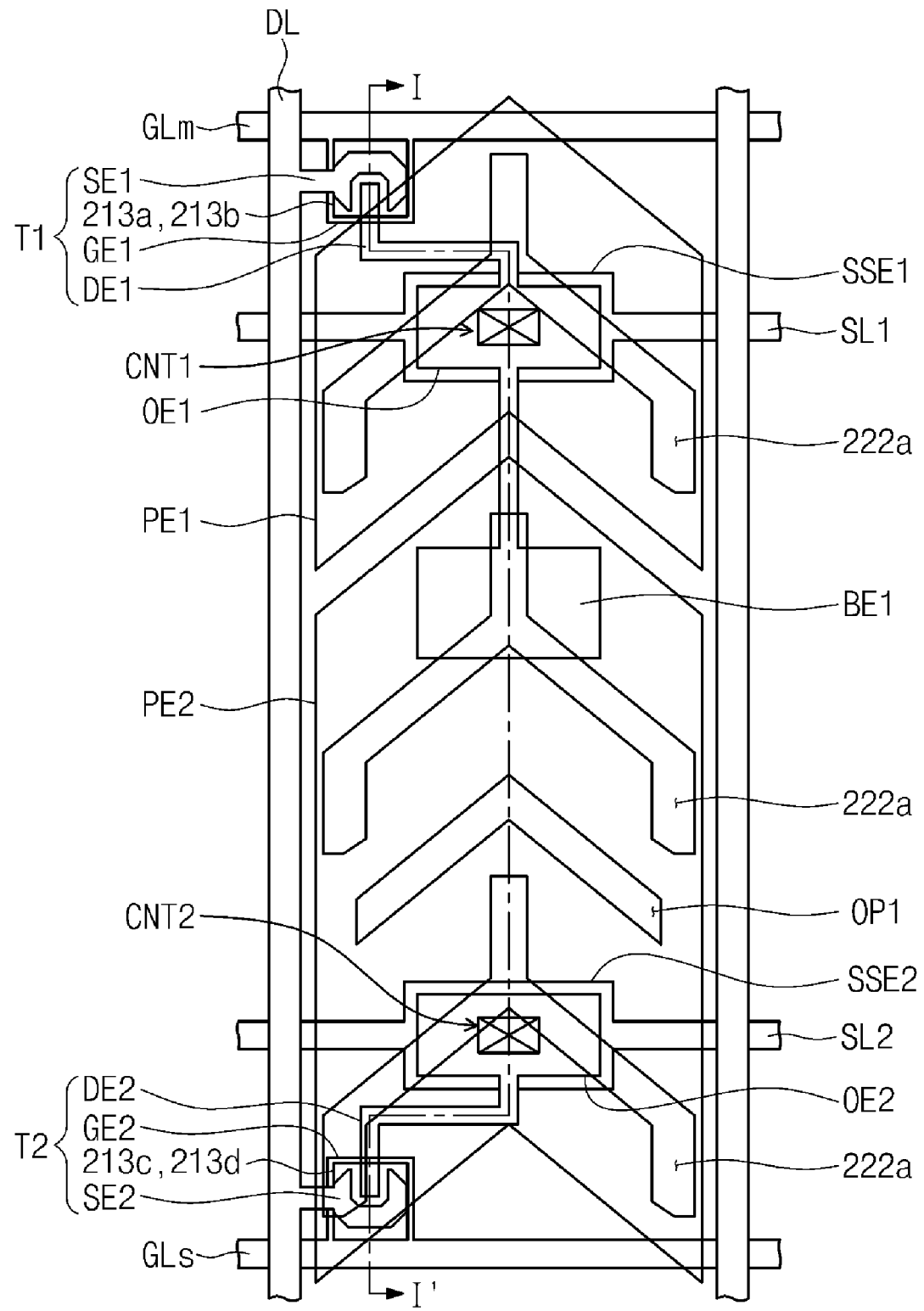
FIG. 4 is a plan view showing a layout of the pixel shown in FIG. 1.
Figure 5:
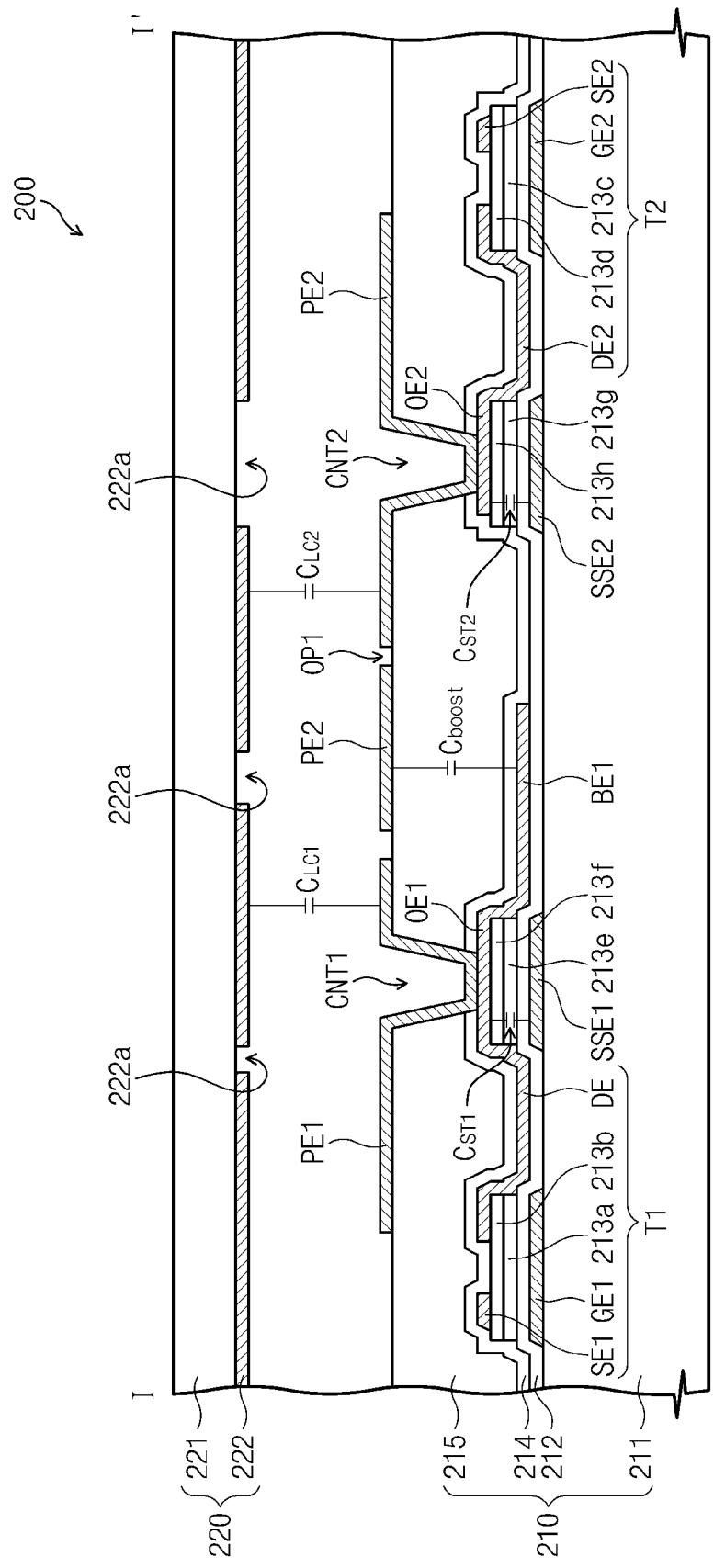
FIG. 5 is a sectional view taken along line I-I' of FIG. 4.

FIG. 4 is a plan view showing a layout of the pixel shown in FIG. 1, and FIG. 5 is a sectional view taken along a line I-I' of FIG. 4.

Referring to FIG. 4 and FIG. 5, the liquid crystal display is provided with a liquid crystal display panel 200, and the liquid crystal display panel 200 includes a thin film transistor substrate 210, an opposite substrate 220 coupled with the thin film transistor substrate 210, and a liquid crystal layer (not shown) interposed between the thin film transistor substrate 210 and the opposite substrate 220.

The thin film transistor substrate 210 includes a first base substrate 211, the first thin film transistor T1, the second thin film transistor T2, the first pixel electrode PE1, the second pixel electrode PE2, the first storage capacitor $C_{ST1}$, the second storage capacitor $C_{ST2}$, and the boosting capacitor $C_{boost}$.

The main gate lines GLm and the sub-gate lines GLs extending in parallel to the main gate lines GLm are formed on the first base substrate 211. A gate electrode GEL 1 of the first thin film transistor T1 branches from the main gate line GLm, and a gate electrode GE2 of the second thin film transistor T2 branches from the sub-gate line GLs.

A first storage line SL1 and a second storage line SL2 are arranged between the main gate line GLm and the sub-gate line GLs while extending in parallel to the main gate line GLm. The first and second storage lines SL1 and SL2 are spaced apart from each other by a predetermined interval. The first and second storage lines SL1 and SL2 include the same material as the main and sub-gate lines GLm and GLs, and are formed on the first base substrate 211. The storage voltage $V_{cst}$ shown in FIG. 1 is applied to the first and second storage lines SL1 and SL2.

A first storage electrode SSE1 extends from the first storage line SL1, and a second storage electrode SSE2 extends from the second storage line SL2.

A gate insulating layer 212 is coated over the first base substrate 211 to cover the lines GLm, GLs, SL1, and SL2 and the electrodes GE1, GE2, SSE1, and SSE2 formed on the first base substrate 211. First to fourth active patterns 213a, 213c, 213e, and 213g are formed on the gate insulating layer 212, and first to fourth ohmic contact patterns 213b, 213d, 213f, and 213h are formed on the first to fourth active patterns 213a, 213c, 213e, and 213g, respectively. The first active pattern 213a and the first ohmic contact pattern 213b are formed corresponding to a region in which the gate electrode GE1 of the first thin film transistor T1 is formed, and the second active pattern 213c and the second ohmic contact pattern 213d are formed corresponding to a region in which the gate electrode GE2 of the second thin film transistor T2 is formed.

In addition, the third active pattern 213e and the third ohmic contact pattern 213f are formed corresponding to a region in which the first storage electrode SSE1 is formed, and the fourth active pattern 213g and the fourth ohmic contact pattern 213h are formed corresponding to a region in which the second storage electrode SSE2 is formed.

The data lines DL extending vertically to the main gate lines GLm are arranged on the gate insulating layer 212. The source electrode SE1 of the first thin film transistor T1 branches from the data line DL and is disposed on the first ohmic contact pattern 213b, and the drain electrode DE1 of the first thin film transistor T1 is disposed on the first ohmic contact pattern 213b while being spaced apart from the source electrode SE1 by a predetermined interval. In addition, the source electrode SE2 of the second thin film transistor T2 branches from the data line DL to be disposed on the second ohmic contact pattern 213d, and the drain electrode DE2 of the second thin film transistor T2 is disposed on the second ohmic contact pattern 213d while being spaced apart from the source electrode SE2 by a predetermined interval.

As described above, the first and second thin film transistors T1 and T2 are formed on the first base substrates 211.

Meanwhile, a first opposite electrode OE1 coupled with the first storage electrode SSE1 in opposition to each other is formed on the third ohmic contact pattern 213f, and a second opposite electrode OE2 coupled with the second storage electrode SSE2 in opposition to each other is formed on the fourth ohmic contact pattern 213h. The first opposite electrode OE1 extends from the drain electrode DE1 of the first thin film transistor T1, and the second opposite electrode OE2 extends from the drain electrode DE2 of the second thin film transistor T2.

The first storage capacitor $C_{ST1}$ includes the first storage electrode SSE1 and the first opposite electrode OE1, and the second storage capacitor $C_{ST2}$ includes the second storage electrode SSE2 and the second opposite electrode OE2.

A boosting electrode BE1 extending from the first opposite electrode OE1 is provided on the gate insulating layer 212. The boosting electrode BE1 is connected to the drain electrode DE1 of the thin film transistor T1 through the first opposite electrode OE1. In the present exemplary embodiment, the boosting electrode BE1 is defined as a lower electrode of the boosting capacitor shown in FIG. 1.

The first and second thin film transistors T1 and T2, the opposite electrodes OE1 and OE2, which serve as upper electrodes of the first and second storage capacitors $C_{ST1}$ and $C_{ST2}$, respectively, and the boosting electrode BE1 are covered with a protective layer 214. An organic insulating layer 215 is coated on the protective layer 214. A first contact hole CNT1 and a second contact hole CNT2 are formed through the protective layer 214 and the organic insulating layer 215 to expose the first opposite electrode OE1 and the second opposite electrode OE2, respectively.

The first and second pixel electrodes PE1 and PE2 are formed on the organic insulating layer 215. The first and second pixel electrodes PE1 and PE2 are spaced apart from each other by a predetermined interval such that the first and second pixel electrodes PE1 and PE2 are insulated from each other. The first and second pixel electrodes PE1 and PE2 include a transparent conductive material.

The first pixel electrode PE1 makes contact with the first opposite electrode OE1 through the first contact hole CNT1, and is connected to the drain electrode DE1 of the first thin film transistor T1 through the first opposite electrode OE1. The second pixel electrode PE2 makes contact with the second opposite electrode OE2 through the second contact hole CNT2, and is connected to the drain electrode DE2 of the second thin film transistor T2 through the second opposite electrode OE2.

A portion of the second pixel electrode PE2 faces the boosting electrode BE1 with the protective layer 214 and the organic insulating layer 215 being interposed therebewteen, thereby forming the boosting capacitor $C_{boost}$.

Although the boosting capacitor shown in FIG. 4 and FIG. 5 includes the first opposite electrode OE1 and the second pixel electrode PE2, it may have alternate configurations. For example, the boosting capacitor may include the first pixel electrode PE1 and the second opposite electrode OE2.

In the present exemplary embodiment, the second pixel electrode PE2 has an area greater than that of the first pixel electrode PE1. In particular, the second pixel electrode PE2 has an area two times larger than that of the first pixel electrode PE1. A first opening OP1 is formed on a predetermined area of the second pixel electrode PE2. The first opening OP1 is formed by removing a portion of the second pixel electrode PE2.

Meanwhile, the opposite substrate 220 includes a second base substrate 221 and the common electrode 222 formed on the second base substrate 221. The common electrode 222 includes a transparent conductive material and faces the first and second pixel electrodes PE1 and PE2. The first liquid crystal capacitor $C_{LC1}$ is formed between the common electrode 222 and the first pixel electrode PE1, and the second liquid crystal capacitor $C_{LC2}$ is formed between the common electrode 222 and the second pixel electrode PE2.

A second opening 222a is formed on the common electrode 222. The second opening 222a is formed by removing a portion of the common electrode 222. The second opening 222a divides a region, on which the first and second pixel electrodes PE1 and PE2 are formed, into a plurality of domains. According to the above structure, liquid crystal molecules of the liquid crystal layer are aligned in different directions in each domain, thereby improving the lateral viewing angle of the liquid crystal display.

Although not shown in FIG. 4 and FIG. 5, the opposite substrate 220 may further include a black matrix and a color filter layer.

Figure 6:
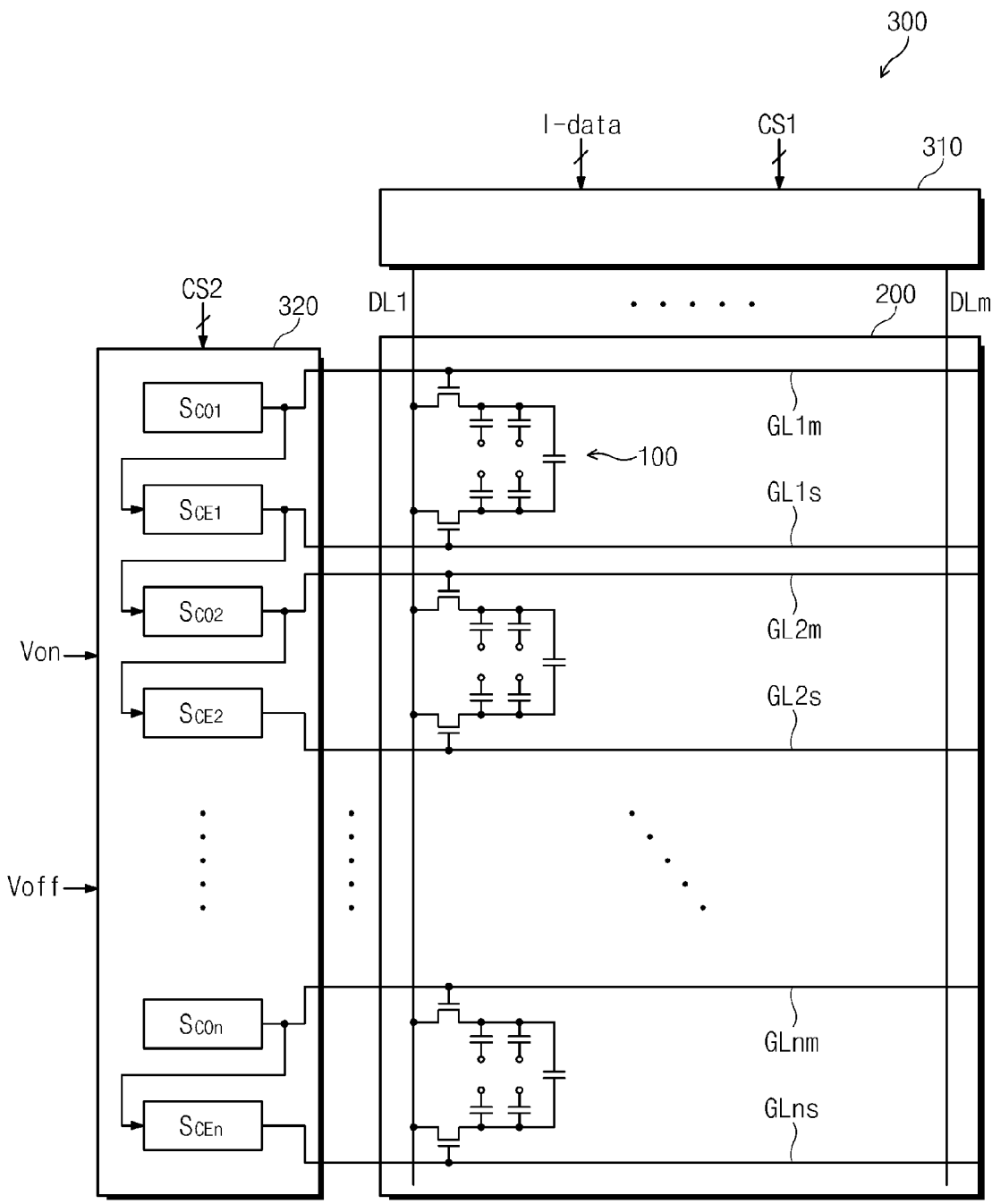
FIG. 6 is a block diagram showing a liquid crystal display according to an exemplary embodiment of the present invention.
Figure 7:
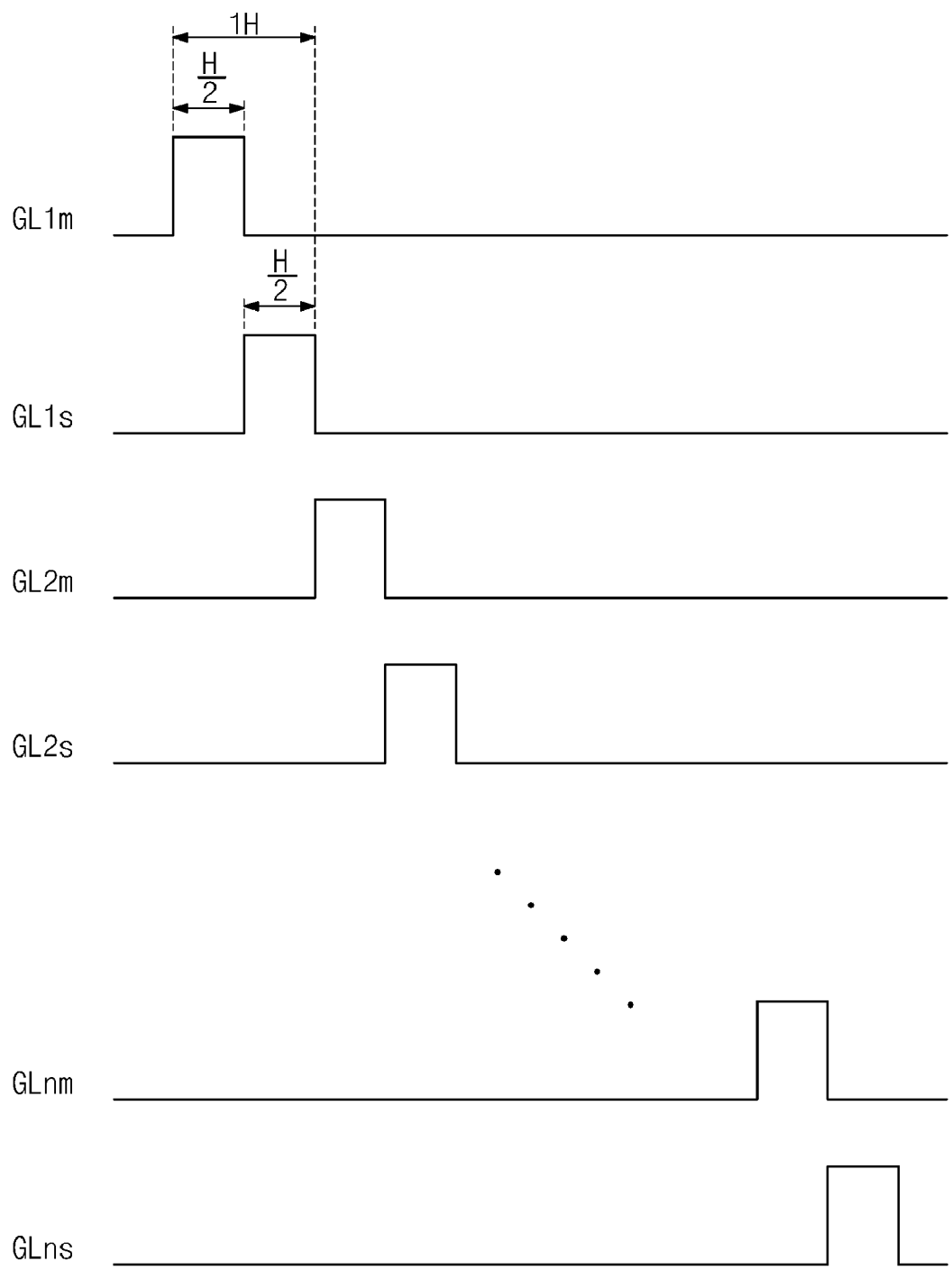
FIG. 7 is a waveform diagram of first and second gate signals shown in FIG. 6.

FIG. 6 is a block diagram showing a liquid crystal display according to an exemplary embodiment of the present invention, and FIG. 7 is a waveform diagram of first and second gate signals shown in FIG. 6.

Referring to FIG. 6, a liquid crystal display 300 includes a liquid crystal display panel 200 to display images, a data driver 310 that is provided at a first side of the liquid crystal display panel 200 to provide the data signal, and a gate driver 320 that is provided at a second side of the liquid crystal display panel 200 to provide the first and second gate signals.

The liquid crystal display panel 200 includes a plurality of main gate lines GL1m to GLnm, a plurality of sub-gate lines GL1s to GLns, a plurality of data lines DL1 to DLm, and a plurality of pixels 100. Since the liquid crystal display panel 200 has been described in detail with reference to FIG. 1, FIG. 2, FIG. 3, FIG. 4 and FIG. 5, descriptions of the liquid crystal display panel 200 and the pixels 100 provided thereon will be omitted.

The data driver 310 is connected to the data lines DL1 to DLm that are provided on the liquid crystal display panel 200. The data driver 310 receives an image data signal I-data and a data control signal CS1 to apply the data signal to the data lines DL1 to DLm at an appropriate timing.

The gate driver 320 is connected to the main gate lines GL1m to GLnm and the sub-gate lines GL1s to GLns that are provided on the liquid crystal display panel 200. The gate driver 320 includes a shift register of which plural stages $S_{CO1}$, $S_{CE1}$ to $S_{COn}$ and $S_{CEn}$ are connected to each other sequentially.

Stages $S_{CO1}$ to $S_{COn}$ are respectively connected to the main gate lines GL1m to GLnm to provide the first gate signal, and stages $S_{CE1}$ to $S_{CEn}$ are respectively connected to the sub-gate lines GL1s to GLns to provide the second gate signal.

As shown in FIG. 7, on the assumption that one frame has a time period of 1F and 1F/2n is represented as 1H, the first gate signal is applied to the first main gate line GL1m for an earlier half period of a first 1H and the second gate signal is applied to the first sub-gate line GL1s for a later half period of the first 1H.

Then, the first gate signal is applied to the second main gate line GL2m for an earlier half period of a second 1H, and the second gate signal is applied to the second sub-gate line GL2s for a later half period of the second 1H.

The above process may be repeated over a period of n-th 1H. As described above, the first gate signal and the second gate signal are alternately output. Accordingly, the gate driver may include one shift register capable of outputting the first and second gate signals.

According to the above, when the sub-pixel is charged with the sub-pixel voltage in a state in which the main pixel is pre-charged with the main pixel voltage, the main pixel voltage is increased by the boosting capacitor. That is, the main pixel and the sub-pixel are charged with different voltages, so that the lateral visibility of the display apparatus may be improved.

In addition, the main pixel voltage is increased to a voltage greater than the input voltage corresponding to the data signal, which may improve the brightness of the display apparatus in a high gray scale.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display apparatus that comprises a plurality of pixels, each pixel comprising:
a main pixel to receive a data signal in response to a first gate signal, the main pixel to be charged with a main pixel voltage;

a sub-pixel to receive the data signal in response to a second gate signal, the sub-pixel to be charged with a sub-pixel voltage; and a boosting capacitor to increase the main pixel voltage when the sub-pixel is charged with the sub-pixel voltage.

2. The display apparatus of claim 1, wherein the increased main pixel voltage has a voltage greater than a voltage of the sub-pixel voltage.

3. The display apparatus of claim 2, wherein the sub-pixel is pre-charged with a pre-charge voltage when the main pixel is charged with the main pixel voltage.

4. The display apparatus of claim 1, further comprising:
a plurality of main gate lines to which the first gate signal is sequentially applied;
a plurality of sub-gate lines to which the second gate signal is sequentially applied, the sub-gate lines extending substantially parallel with the main gate lines; and
a plurality of data lines to which the data signal is applied, the data lines being insulated from the main gate lines and the sub-gate lines.

5. The display apparatus of claim 4, wherein the main pixel comprises:
a first thin film transistor connected to a corresponding data line of the data lines and a corresponding main gate line of the main gate lines; and
a first liquid crystal capacitor connected to an output terminal of the first thin film transistor, the first liquid crystal capacitor to be charged with the main pixel voltage.

6. The display apparatus of claim 5, wherein the sub-pixel comprises:
a second thin film transistor connected to the corresponding data line of the data lines and a corresponding sub-gate line of the sub-gate lines; and
a second liquid crystal capacitor connected to an output terminal of the second thin film transistor, the second liquid crystal capacitor to be charged with the sub-pixel voltage.

7. The display apparatus of claim 5, wherein the boosting capacitor is connected to the output terminal of the first thin film transistor and the output terminal of the second thin film transistor.

8. The display apparatus of claim 6, wherein the main pixel further comprises a first storage capacitor connected to the first liquid crystal capacitor in parallel, and
the sub-pixel further comprises a second storage capacitor connected to the second liquid crystal capacitor in parallel.

9. The display apparatus of claim 6, further comprising:
a first substrate on which the main gate lines, the sub-gate lines, and the data lines are arranged;
a second substrate coupled with the first substrate; and
a liquid crystal layer disposed between the first substrate and the second substrate.

10. The display apparatus of claim 9, wherein the first liquid crystal capacitor comprises a first pixel electrode connected to the output terminal of the first thin film transistor, the liquid crystal layer, and a common electrode disposed on the second substrate, and
wherein the second liquid crystal capacitor comprises a second pixel electrode connected to the output terminal of the second thin film transistor, the liquid crystal layer, and the common electrode.

11. The display apparatus of claim 10, wherein the boosting capacitor comprises a first electrode extending from the output terminal of the first thin film transistor, a second electrode that is a portion of the second pixel electrode, and an insulating layer disposed between the first electrode and the second electrode.

12. The display apparatus of claim 1, wherein, under conditions that the display apparatus comprises n sub-gate lines and n main gate lines are prepared, one frame is defined as a time period of 1F, and 1F/2n is represented as 1H, the first gate signal applied to the main gate lines is maintained in a high state for an earlier period of H/2, and the second gate signal applied to the sub-gate lines is maintained in a high state for a later period of H/2.

13. The display apparatus of claim 12, further comprising:
a gate driver to output the first gate signal and the second gate signal; and
a data driver to output the data signal.

14. The display apparatus of claim 13, wherein the gate driver comprises a shift register in which plural stages are connected to each other sequentially, and
wherein odd-numbered stages of the stages are connected to the main gate lines to provide the first gate signal, and even-numbered stages of the stages are connected to the sub-gate lines to provide the second gate signal.

15. The display apparatus of claim 12, wherein a value of the data signal is constant for a period of 1H.

16. The display apparatus of claim 15, wherein a polarity of the data signal is inverted every frame.

17. A display apparatus that comprises a plurality of pixels, each pixel comprising:
a main pixel to receive a data voltage in response to a first gate signal from a first gate line, the main pixel to be charged with the data voltage;
a sub-pixel to receive the data voltage in response to a second gate signal from a second gate line, the sub-pixel to be charged with the data voltage, and the second gate signal following the first gate signal,
wherein the main pixel is charged with a first voltage that exceeds the data voltage in response to the sub-pixel being charged with the data voltage, the first gate signal being off when the main pixel is charged with the first voltage.

18. The display apparatus of claim 17, further comprising:
a first transistor disposed in the main pixel and connected to the first gate line;
a second transistor disposed in the sub-pixel and connected to the second gate line; and
a boosting capacitor comprising a first electrode and a second electrode, the first electrode being connected to an output electrode of the first transistor and the second electrode being connected to an output electrode of the second transistor.

19. A display apparatus that comprises a plurality of pixels, each pixel comprising:
a main pixel comprising a first thin film transistor, the main pixel to receive a data signal in response to a first gate signal, the main pixel to be charged with a main pixel voltage;
a sub-pixel comprising a second thin film transistor, the sub-pixel to receive the data signal in response to a second gate signal, the sub-pixel to be charged with a sub-pixel voltage; and
a boosting capacitor to increase the main pixel voltage when the sub-pixel is charged with the sub-pixel voltage, wherein the boosting capacitor is connected to the output terminal of the first thin film transistor and the output terminal of the second thin film transistor.

* * * * *